Figure 1:
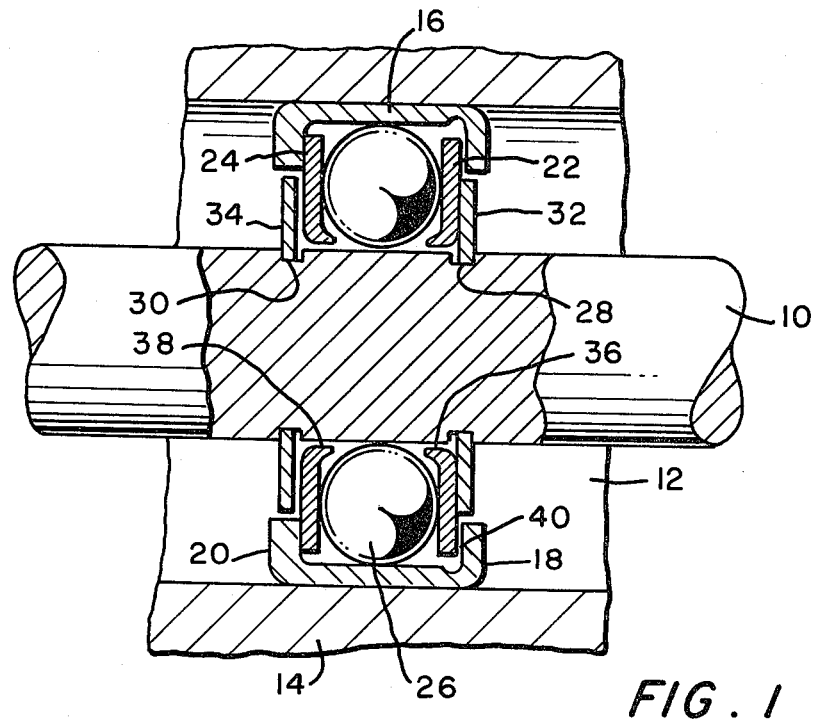

United States Patent [19]

McGuffie

[11] 4,382,639
[45] May 10, 1983

[54] BI-DIRECTIONAL THRUST AND RADIAL BALL BEARING

[75] Inventor: Michael J. McGuffie, Harwinton, Conn.

[73] Assignee: The Torrington Company, Torrington, Conn.

[21] Appl. No.: 248,698

[22] Filed: Mar. 30, 1981

[51] Int. Cl.³ ............................................. F16C 19/14
[52] U.S. Cl. ............................... 308/189 R; 308/233; 308/DIG. 4
[58] Field of Search ............... 308/233, 235, 232, 219, 308/184 R, 188, 163, 164, 175, DIG. 11, 234, 174, 176, DIG. 4

[56] References Cited
U.S. PATENT DOCUMENTS 3,125,383  3/1964  Stahlecker et al. .................. 308/174
3,610,714 10/1971  De Gaeta ......................... 308/174 X
3,653,732  4/1972  Fairbank ......................... 308/174 X
4,099,761  7/1978  Cullings ......................... 308/163 X

FOREIGN PATENT DOCUMENTS 192897  2/1923  United Kingdom ................ 308/188

Primary Examiner—Stuart S. Levy
Assistant Examiner—David Werner
Attorney, Agent, or Firm—Frank S. Troidl

[57] ABSTRACT

The ball bearing comprises a pressed metal cup in which are loosely-mounted axially-spaced, pressed metal thrust washers which contact a plurality of balls. The thicknesses of the thrust washers and the diameter of the balls are chosen so that an axial clearance between the metal cup and a thrust washer is provided when the other thrust race engages the cup and the balls are in contact with both thrust washers.

3 Claims, 2 Drawing Figures

BI-DIRECTIONAL THRUST AND RADIAL BALL BEARING

This invention relates to bearings. More particularly, this invention is a new bi-directional thrust and radial ball bearing.

For many applications, for example, to keep electric motors efficient, bearings must be used which are capable of accommodating both radial and axial loads. Often, the bearing must be capable of accommodating axial loads in two directions in addition to radial loads. The usual procedure for anti-frictionizing axial loads in two directions is to use relatively expensive machined race ball bearings with stepped housings and shafts.

With my new invention, a bi-directional thrust and radial ball bearing is provided which is economical and can eliminate the need for housing and/or shaft steps. My new bi-directional thrust and radial ball bearing includes a combination of pressed metal parts, balls, and press-fits to anti-frictionize axial thrust loads in two directions and radial loads at a significantly lower assembly cost than with current machined race ball bearings. This bearing also lends itself very well to greased-for-life applications because of its excellent grease capacity, and inherent shielding which keeps lubricants in and contaminants out.

Briefly described, this new bi-directional thrust and radial ball bearing comprises a pressed metal cup with end flanges. A pair of loosely-mounted, axially-spaced, pressed metal annular thrust washers are retained in the metal cup by the cup end flanges. A plurality of balls are adapted to be contacted by the annular thrust washers. The diameter of each ball and the thicknesses of the thrust washers are such that a small axial clearance exists between one end flange and one thrust washer when the other end flange is engaged by the other thrust washer and the balls are in contact with both thrust washers.

Figure 2:
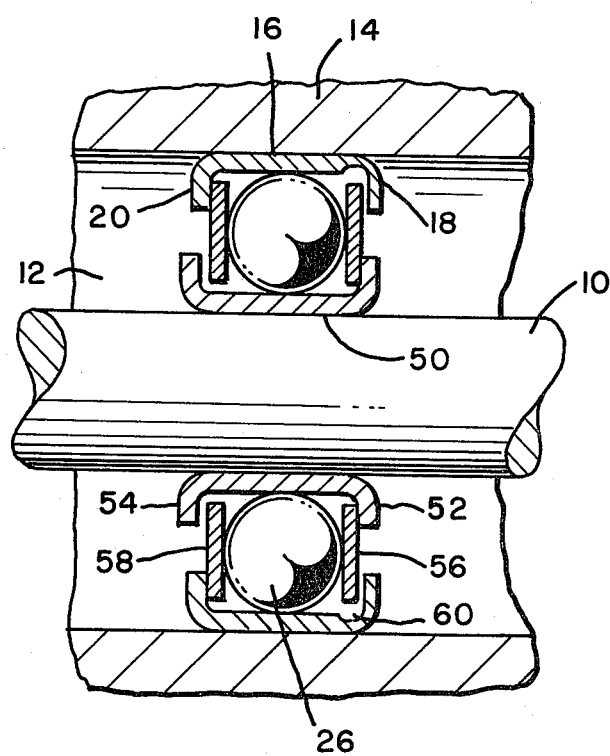

The invention, as well as its many advantages, may be further understood by reference to the following detailed description and drawings in which:

FIG. 1 is a sectional, elevational view showing one preferred embodiment of the new bearing mounted about a shaft in a housing; and FIG. 2 is a sectional, elevational view showing a second preferred embodiment of the bearing mounted about a shaft within a housing.

In the various figures, like parts are referred to by like numbers.

Referring particularly to FIG. 1, the bi-directional thrust and radial ball bearing is mounted about a shaft 10 which extends through a bore 12 of housing 14. A pressed metal cup 16 having annular end flanges 18 and 20 is press-fit in the bore 12 of housing 14. The fit of the cup 16 is tight enough that once the cup is inserted in the bore 12, it will not be movable under normal operating conditions.

A pair of axially-spaced, pressed metal, annular thrust washers 22 and 24 are loosely mounted within the cup 16. Cup flanges 18 and 20, respectively, axially retain the annular pressed metal thrust washers 22 and 24, respectively, within the cup 16. A plurality of balls 26 are adapted to be contacted by the pressed metal thrust washers 22 and 24.

The rotatable shaft 10 is provided with axially-spaced, annular grooves 28 and 30 in which are placed snap rings 32 and 34, respectively. Oppositely-facing, inner-annular flanges 36 and 38 on pressed metal thrust washers 22 and 24, respectively, help keep the balls 26 in the proper radial position.

An important feature of the bi-directional thrust and radial ball bearing is that the thicknesses of the thrust washers 22 and 24 and the diameter of the balls 26 are such that an axial clearance 40 exists between the flange 18 and the thrust washer 22 when the thrust washer 24 is in contact with flange 20 and the balls 26 contact both the thrust washers 22 and 24. Thus, if an axial force is exerted toward the left, looking at FIG. 1, the pressed metal thrust washer 22 will be contacted by the snap ring 32 to press the balls 26 against the pressed metal thrust washer 24, which, in turn, is pressed against the flange 20. Because of clearance 40, the pressed metal thrust washer 22 will rotate with respect to the pressed metal thrust washer 24. The rotating shaft rotates the snap ring 32 at a fast rate, which in turn, rotates thrust washer 22. The cup 16 in housing 14 is fixed against rotation. Thus, while shaft 10 and thrust washer 22 rotate at a fast rate, under normal conditions, thrust washer 24 is kept still because it is pressed against the stationary cup 16.

If a force is exerted along the shaft 10 toward the righthand direction, looking at FIG. 1, the snap ring 34 will engage pressed metal thrust washer 24 which will be pressed against the balls 26 and the balls will press the thrust washer 22 against the flange 18. This will create a clearance between flange 20 and thrust washer 24. In such case, the pressed metal thrust washer 24 will rotate while the pressed metal thrust washer 22 is still. Thus, this new bearing provides a fine, economical bearing which accommodates radial loads and also thrust loads in two directions.

In the embodiment of FIG. 2, instead of the snap rings, a pressed metal sleeve 50 having radially, outwardly-extending end flanges 52 and 54 is press-fit on the shaft 10. The pressed metal annular races 56 and 58 are retained within the bearing by the end flanges 18 and 20 of cup 16 which is press-fit in the bore 12 of housing 14. The balls 26 are adapted to be engaged by the annular pressed metal thrust washers 56 and 58. The diameter of the balls 26 and the thicknesses of the thrust washers 56 and 58 are such that an axial clearance 60 will exist between the annular flange 18 and thrust washer 56 if a force is exerted along the shaft 10 which presses flange 52 on sleeve 50 against the thrust washer 56 which presses the balls 26 against thrust washer 58 which, in turn, is pressed against the annular flange 20 on cup 16. Thus, if shaft 10 rotates, the pressed metal thrust washer 56 will rotate.

If an axial force is exerted in the opposite direction, the sleeve 50 will be moved along with shaft 10 so that the flange 54 contacts thrust washer 58 which presses the balls 26 against thrust washer 56 which contacts annular flange 18. Thus, the thrust washer 58 will rotate. Thus, as with the embodiment of FIG. 1, the bearing accommodates thrust forces in two directions as well as radial forces.

I claim:

1. A bi-directional thrust and radial ball bearing comprising: a pressed metal cup having a first end flange and a second end flange, a first pressed metal, annular thrust washer and a second pressed metal annular thrust washer axially spaced from said first thrust washer and loosely retained in the metal cup by the end flanges; and a plurality of balls adapted to be contacted by the annular thrust washers, the diameter of each ball and the thicknesses of the thrust washers being such that an axial force in one axial direction causes the first thrust washer to press the balls against the second thrust washer, which, in turn, is pressed against said second metal cup end flange to form an axial clearance between said first metal cup end flange and the first thrust washer, and an axial force in the other axial direction causes the second thrust washer to press the balls against the first thrust washer, which, in turn is pressed against said first metal cup end flange to form an axial clearance between said second metal cup end flange and the second thrust washer.

2. A bearing in accordance with claim 1 wherein: each thrust washer has an axially-extending, inner-annular flange extending in the opposite direction from the annular flange of the other thrust washer, said inner-annular flanges being constructed to retain the balls.

3. A bi-directional thrust and radial ball bearing in accordance with claim 1 further comprising a pressed metal sleeve having radially outwardly extending end flanges.

* * * * *